(12) United States Patent
Kulkarni

(10) Patent No.: US 10,899,301 B2
(45) Date of Patent: Jan. 26, 2021

(54) ASSEMBLY OF A DRIVER AIRBAG MODULE AND A STEERING WHEEL

(71) Applicant: Key Safety Systems, Inc., Sterling Heights, MI (US)

(72) Inventor: Shreyas R Kulkarni, Rüsselsheim (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 65 days.

(21) Appl. No.: 16/167,963

(22) Filed: Oct. 23, 2018

(65) Prior Publication Data

US 2020/0108790 A1 Apr. 9, 2020

(30) Foreign Application Priority Data

Oct. 5, 2018 (EP) ..................................... 18198876

(51) Int. Cl.
*B60R 21/203* (2006.01)

(52) U.S. Cl.
CPC ................................ *B60R 21/2037* (2013.01)

(58) Field of Classification Search
CPC ............ B60R 21/2032; B60R 21/2035; B60R 21/2037; B60R 21/203; B60R 2021/21537
See application file for complete search history.

(56) References Cited

U.S. PATENT DOCUMENTS

| | | | | |
|---|---|---|---|---|
| 3,822,894 A | * | 7/1974 | Muller | B60R 21/203 280/731 |
| 5,360,231 A | * | 11/1994 | Adams | B60R 21/205 280/728.1 |
| 5,409,256 A | * | 4/1995 | Gordon | B60R 21/2035 280/728.2 |
| 5,676,395 A | | 10/1997 | Oe et al. | |
| 5,722,684 A | * | 3/1998 | Saderholm | B60R 21/2171 280/728.3 |
| 5,779,261 A | * | 7/1998 | Honda | B60R 21/2176 280/728.2 |
| 5,826,901 A | * | 10/1998 | Adomeit | B60R 21/05 280/728.2 |
| 6,588,795 B2 | * | 7/2003 | Fischer | B60R 21/2035 280/736 |
| 6,688,638 B2 | * | 2/2004 | Schutz | B60Q 5/003 200/61.55 |
| 6,893,044 B2 | | 5/2005 | Holmes et al. | |

(Continued)

FOREIGN PATENT DOCUMENTS

DE 2131902 12/1972
DE 102005054459 A1 5/2007

(Continued)

OTHER PUBLICATIONS

European Search Report relating to European Patent Application No. 18198876.7, dated Mar. 15, 2019.

*Primary Examiner* — Laura Freedman
(74) *Attorney, Agent, or Firm* — Meunier Carlin & Curfman LLC

(57) ABSTRACT

An assembly of a driver airbag module and a steering wheel comprises connecting elements for connection of the airbag module with the steering wheel, the elements comprising a hinge or other connection means that allow the airbag module to swivel or rotate with respect to the steering wheel.

17 Claims, 6 Drawing Sheets

(56) References Cited

U.S. PATENT DOCUMENTS

| | | | | |
|---|---|---|---|---|
| 7,185,915 B2* | 3/2007 | Fujita | ............... | B60R 21/2037 |
| | | | | 280/731 |
| 7,316,414 B2* | 1/2008 | Bathon | ............... | B60Q 5/003 |
| | | | | 280/728.2 |
| 7,380,817 B2* | 6/2008 | Poli | ............... | B60R 21/2037 |
| | | | | 200/61.54 |
| 7,390,018 B2* | 6/2008 | Ridolfi | ............... | B60R 16/027 |
| | | | | 280/731 |
| 7,398,994 B2* | 7/2008 | Poli | ............... | B60R 21/2037 |
| | | | | 200/61.54 |
| 7,475,902 B2* | 1/2009 | Shiga | ............... | B60R 21/203 |
| | | | | 280/731 |
| 9,221,418 B1* | 12/2015 | Pline | ............... | B60R 21/217 |
| 9,834,121 B2* | 12/2017 | Riefe | ............... | B60N 3/005 |
| 2007/0080520 A1 | 4/2007 | Jeong | | |
| 2009/0315304 A1 | 12/2009 | Hagelgans et al. | | |
| 2012/0242064 A1* | 9/2012 | Weigand | ............... | B60Q 5/003 |
| | | | | 280/728.2 |
| 2017/0178846 A1* | 6/2017 | Raikar | ............... | B60R 21/203 |
| 2019/0344744 A1* | 11/2019 | Spencer | ............... | H01H 13/14 |

FOREIGN PATENT DOCUMENTS

| | | |
|---|---|---|
| WO | 2013070905 | 10/2006 |
| WO | 2006103553 | 5/2013 |

\* cited by examiner

ASSEMBLY OF A DRIVER AIRBAG MODULE AND A STEERING WHEEL

TECHNICAL FIELD

The present invention relates to an assembly of a driver airbag module and a steering wheel.

BACKGROUND OF THE INVENTION

Motor vehicle steering wheels have an armature including a rim, a central portion connected to a steering shaft and one or more spokes connecting the rim to the central portion. Driver airbag modules (commonly referred to as DAB modules) are designed to be attached to the central portion of the steering wheel. In known assemblies the driver airbag module is conventionally housed in a carrier, typically associated with the steering wheel and steering column of the motor vehicle, and it is configured in such a manner that, when deployed on a collision, the airbag will prevent the driver from striking the steering wheel assembly.

The conventional airbag modules can include an airbag housed in the carrier, an inflator which rapidly inflates the airbag with a pressurized gas on receipt of a signal from crash sensors, and a cover or a pad disposed over the airbag mechanism. The DAB module can be fixed to the carrier by means of snap pins, provided on its back surface, and the carrier can be rotatable with the rim, or can be fixed with respect to the rotational movement of the rim, e.g. by using a planet gear mechanism, such as the one disclosed in DE2131902.

Conventional airbag modules are configured to cooperate with a horn activation mechanism (e.g. a horn activation switch) in a manner that, when the driver operates a certain pressure on a portion of the DAB, the airbag module moves inwardly with respect to the rim, to a lowered position, actuating the horn. The DAB assembly includes a means, e.g. a spring, suitable to bring the DAB back to its initial position, when it is no longer pressed by the driver. On a conventional assembly of driver airbag module and steering wheel, a horn actuator switch is positioned between a portion of the steering wheel and the driver airbag module. For example, the horn actuation system may be positioned inside the carrier, in a position adjacent to the back surface of the housing of the airbag module. To return the DAB in position after actuating the horn switch, the snap pins of the airbag module provided on its back surface may be provided with a coil spring, such that, when the air bag module is pushed down by the pressure operated by the driver, the horn mechanism is actuated, and when the pressure ends, the elastic repulsive force of the coil spring brings the airbag module back to the start position. This arrangement of the connecting means between DAB and steering wheel (or carrier) is conventionally referred to as a floating connection. An airbag cover in a floating connections arrangement is referred to as a floating cover. Horn actuation systems may also be conventionally operated by micro-switches associated with a floating cover of the driver airbag module and actuated by pressing on that cover.

Known ways of attaching a DAB to a steering wheel with a floating, i.e. a snap-in, connection have several drawbacks. A first problem is that known configurations, involve space limitation. Another problem derives from the requirement that the cover must be correctly located with respect to the steering wheel. The cover should be equally spaced from the rest of the steering wheel so that the gaps between the cover and the steering wheel are substantially equal.

Furthermore, a requirement of the modern motor vehicle is to be provided with electronic devices such as monitors and sensors, which can be monitored and operated by the driver without compromising its safety while driving. An ideal position for a monitor is thus on the steering wheel, over the driver airbag module but the configuration of the conventional steering wheel-airbag module assemblies does not leave much room for a monitor.

Additionally, conventional assemblies of driver airbag module and steering wheel can often experience vibrations which are passed on to the driver. The vibrations can be the result of imbalance in the tires or wheels, wheels mounted off-center, roughness of the road, roughness of the braking mechanism, etc. The vibrations can also lead to a "buzz-squeak-rattle" (BSR) effect due to the various components mounted to the steering wheel, depending on the material from which they are made, and from their shape, notably with a floating connection.

Vibrations and "buzz-squeak-rattle" in the steering wheel can affect the comfort of the driver while driving. The airbag modules are conventionally made from metal material, and undergoes vibrations that are present in the steering wheel. These vibrations between the steering wheel and the airbag module can lead to the undesirable "buzz-squeak-rattle" effect. Thus, there is need to provide vibration damping to both the steering wheel and airbag module to reduce vibrations and the relevant noise.

There is therefore the need for an assembly of a driver airbag module and a steering wheel which is compact, easy to assemble and suitable for actuating the horn mechanism of a vehicle without involving space limitation. Furthermore, there is the need to provide an assembly of a driver airbag module and a steering wheel which reduces the vibrations in the steering wheel.

SUMMARY OF THE INVENTION

The above problems are solved by the assembly according to claim 1. More particularly, the present invention relates to an assembly of a driver airbag module and a steering wheel for a motor vehicle comprising a steering wheel having an armature encompassing a volume; an airbag module having a housing; at least one connecting element for the connection of said housing with the steering wheel, characterized in that said at least one connecting element comprises swivel means, whereby upon connection at said connecting means, said air bag module may swivel around the connecting means with respect to said steering wheel. Preferably the connecting means includes a hinge; the airbag module rotates with respect to a plane defined by the steering wheel rim.

Another object of the invention is an airbag module according to claim 12. The DAB module of the invention has at least one connecting element configured to provide a swivelling, i.e. a rotating, connection between DAB and steering wheel assembly. In a preferred embodiment, the said at least one connecting element comprises at least a portion of a hinge.

In an embodiment, the carrier may rotate with the armature of the steering wheel. However in the preferred embodiment, the carrier is fixed with respect to the rotation of the armature of the steering wheel; in such an embodiment, a planetary gear mechanism may be coupled to the steering wheel and to a steering shaft of the vehicle for transferring the rotational movement applied to the steering wheel to the steering shaft. According to an embodiment the non-rotating carrier according to the invention is provided with a hub, configured for connection with a planetary gear mechanism, passing through a hole provided in the central portion of the steering wheel.

Advantageously, in an embodiment where the carrier and the airbag do not rotate with the steering wheel, instruments and safety device, such as a monitor and a DAB are provided together in the assembly.

In an embodiment the airbag module comprises a housing, an airbag and a gas generator. The airbag is folded into the housing which is provided with connecting elements, for the connection with a steering wheel assembly, preferably with a carrier which is part of the steering wheel assembly.

According to an aspect, the driver airbag module can be provided with at least one type of connecting element, preferably with two types of connecting elements, having two different configurations for the connection with the steering wheel according to the invention.

A first embodiment of the connecting elements according to the invention comprises at least one hinge, preferably a plurality of hinges, provided on at least a portion of surface of the housing of the driver airbag module and on the carrier or steering wheel armature. In an embodiment, the hinge comprises at least one hinge flange provided on the DAB housing and a hinge flange provided on the carrier or in general on the steering wheel. The flanges are provided with a through hole; when the holes in the flanges are aligned to form a hinge, they are connected, in a way known for hinges in general, with a hinge wire, suitable to provide a swivel connection with the steering wheel assembly, namely with the carrier.

The housing of the airbag module and the hinge flanges provided on it are preferably made with plastic material, while the hinge wires, having a substantially straight shape or an L-shape, are preferably made with metal material. Advantageously, selecting a plastic material for the housing of the airbag module helps reducing BSR noises by a considerable amount.

A connection between the housing and the steering wheel is operated by means of said hinge. The hinge wire pass through the through holes of the aligned hinge flanges allowing the airbag module to swivel with respect to a plane defined by the rim of the steering wheel. At least one end of the hinge wire is inserted in dedicated recesses provided in the carrier. In an embodiment, the rotation axis of the swivelling DAB module is substantially orthogonal to the axis of rotation of the steering wheel, or to an axis parallel to the axis of rotation of the steering wheel.

In a preferred embodiment, the assembly provides for the presence of an additional connecting means. In an embodiment, the hinge means are provided at one side of the DAB, namely at the DAB's side that is closer to the hub of the steering wheel. The additional connecting elements are provided spaced from the hinge, preferably close to the periphery of said module, on a floating portion of the DAB.

In an embodiment, the additional connecting elements comprise at least one snap pin, preferably two snap pins positioned on at least a portion of the surface of the housing, preferably on the backside of the housing of the airbag module, close to the periphery of the steering wheel assembly.

According to an aspect, the snap pins engage at least one suitable hole or recess provided in the steering wheel, or in the carrier if a carrier is present.

The invention provides several advantages. The hinge connection can be made of proper material, in order to avoid"BSR" noises, thus, even when additional connection snap-pins are provided for attaching the DAB, noise generated by vibrations is greatly reduced. Additionally, the hinge provides a fixed and reproducible connection point that results in an excellent alignment of the DAB and of the DAB's cover, with respect to the steering wheel. By having two different configurations of the connecting elements, i.e. a hinge and (an) additional connecting element(s) a more stable and space saving airbag module is obtained, since the two types of connecting elements cooperate in order to provide a stable and fixed connection between the housing of the airbag module and the steering wheel. Furthermore, when deployment of the driver airbag occurs, the hinge connection allows for a more stable attachment of a monitor attached over the driver airbag module (i.e. in Z+ direction as shown in FIG. 1) with respect to the only floating connection provided by a conventional DAB, since said floating connection allows the deployed driver airbag module to move in all the directions (X, Y, Z) imparting unwanted forces on the adjacent monitor with the result of a possible detachment of the latter from the carrier. Since the hinge connection according to the present invention restricts the movement of the DAB along the Z+ direction, it reduces said unwanted forces on the adjacent monitor.

The presence of a hinge provides a swivelling connection at one end of the DAB; the other end of the DAB is provided with a floating connection, e.g. by means of snap pins, whereby the side of the DAB opposite to the hinge may rotate, i.e. swivel of an angle sufficient to actuate a horn mechanism located in the assembly. This result is obtained while saving space in correspondence of the backside surface of the housing of the airbag module, said space being suitable for positioning other useful elements like, for example, at least a portion of a horn activation mechanism.

According to an aspect, a horn activation mechanism is provided to the assembly of driver airbag module and steering wheel according to the invention. The horn activation mechanism, comprising at least an electric contact connected to the steering wheel, can be mounted on the steering wheel so as to be movable between a raised rest position and a lowered position for horn actuation, by means of at least one spring interposed between an actuating element and the steering wheel for biasing the actuating element towards its raised position.

According to an aspect, the horn activation mechanism can be provided in the lower portion of the steering wheel assembly, preferably in the lower portion of the non-rotating carrier, adjacent to the DAB housing, positioned outside the driver airbag module. According to another aspect, at least a portion of the horn activation mechanism can be provided inside the driver airbag module.

Advantageously the system according to the invention allows high flexibility in choosing the positioning of the horn mechanism, according to the type of driver airbag to be mounted on the motor vehicle. For example, if small packaging size styling is required, the system according to the invention allows to provide a horn mechanism embedded with the driver airbag module.

The horn activation mechanism according to the invention is activated by the pressure operated by the driver on at least a portion of the DAB, preferably on a portion of a cover of the DAB. Preferably, the horn activation mechanism is located in an area where the rotation of the airbag module is sufficient to actuate the horn mechanism.

It has to be noted that, according to an aspect of the present invention, the horn activation mechanism is positioned in correspondence of the lower portion of the non-rotating carrier, i.e. at the so-called 6'o clock position. This position is spaced from the position of the hinge means, that is close to the hub, or rotation axis of the steering wheel.

When the driver operates a certain pressure in correspondence of said 6'o clock position, the driver airbag module swivel along a direction substantially parallel to the axis of rotation of the steering wheel, resulting in the activation of the horn mechanism.

According to an aspect, the compact horn activation mechanism comprises a plastic housing, which can be the same housing of the airbag module, or can be a different housing.

BRIEF DESCRIPTION OF THE DRAWINGS

FIG. 4.a is a schematic rear view of the airbag module comprising an embedded horn mechanism according to a possible embodiment of the invention;

FIGS. 1 and 6 schematically show the assembly 10 of a driver airbag module (DAB) and a steering wheel according to the invention. The assembly comprises a steering wheel 1 including an armature 17 encompassing a volume 15; a carrier 2 is positioned within the volume 15 encompassed by armature 17; carrier 2 houses a driver airbag module 4.

In a possible embodiment according to the present invention the DAB, or carrier 2 can be fixed to the armature 17 of the steering wheel 1 in a way known in the art and be rotated with it. However, it is greatly preferred to fix DAB and monitor (if present) in a stationary condition.

Figure 1:
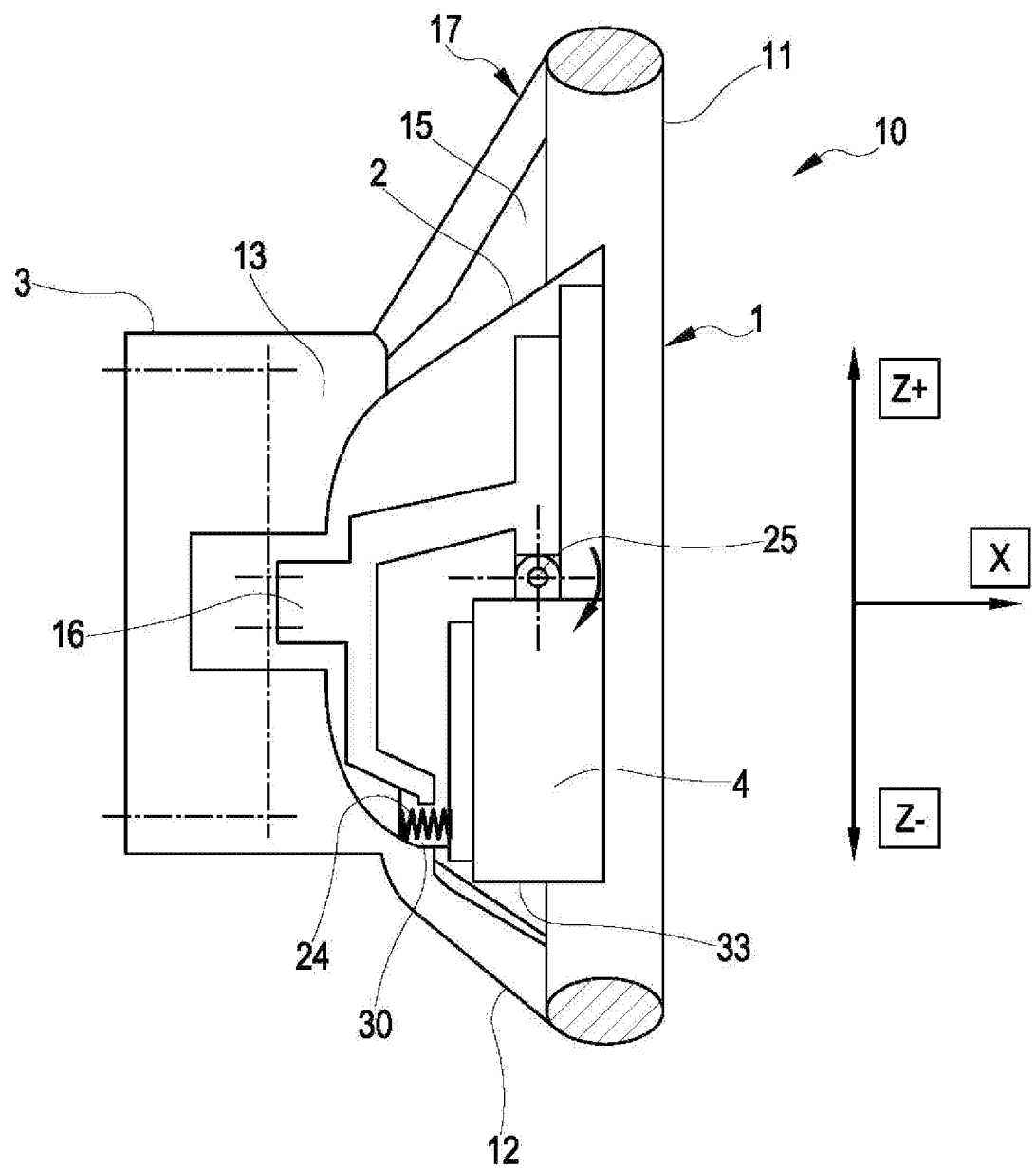
FIG. 1 is a sectional view of the assembly of a driver airbag module (DAB) and a steering wheel according to the invention.
Figure 6:
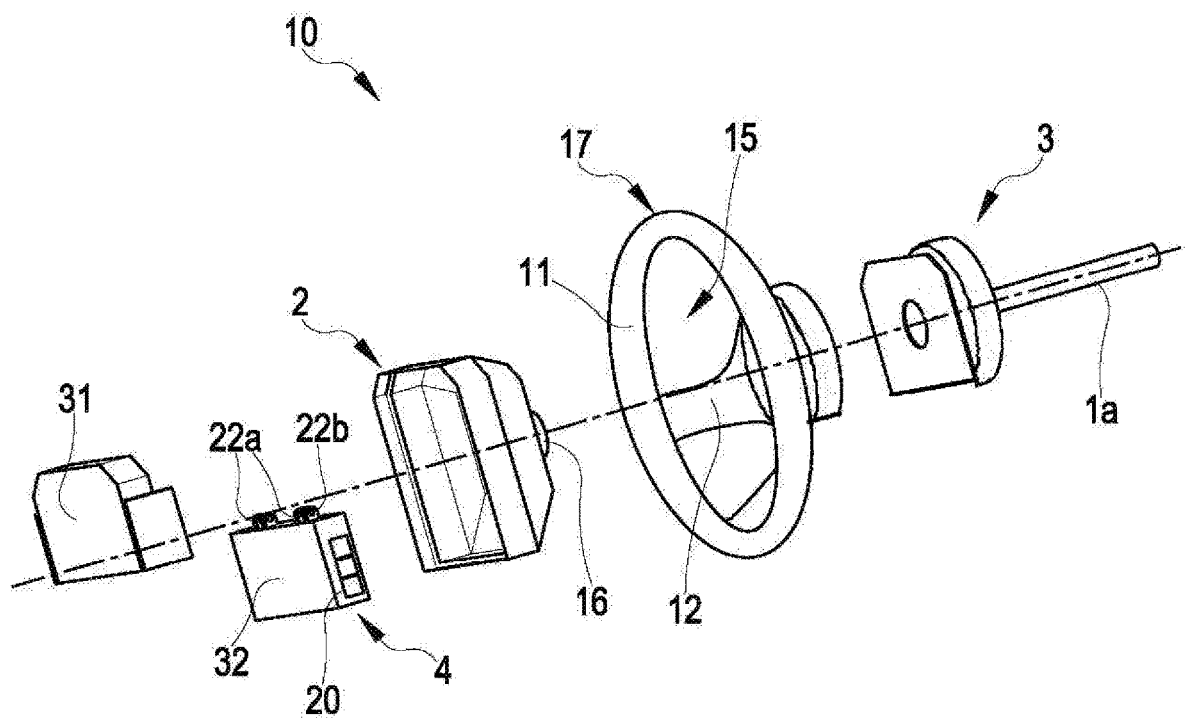
FIG. 6 is an exploded view of the assembly of the driver airbag module and steering wheel according to the invention.

In the preferred embodiment shown in FIGS. 1 and 6, the carrier assembly 2 and the DAB are fixed with respect to the rotation of the armature 17 of the steering wheel. To this purpose a planetary gear mechanism 3 can be coupled to the steering wheel 1 and to the steering shaft 1a of the vehicle, for transferring to the steering shaft the rotational movements applied to the steering wheel.

Figure 2:
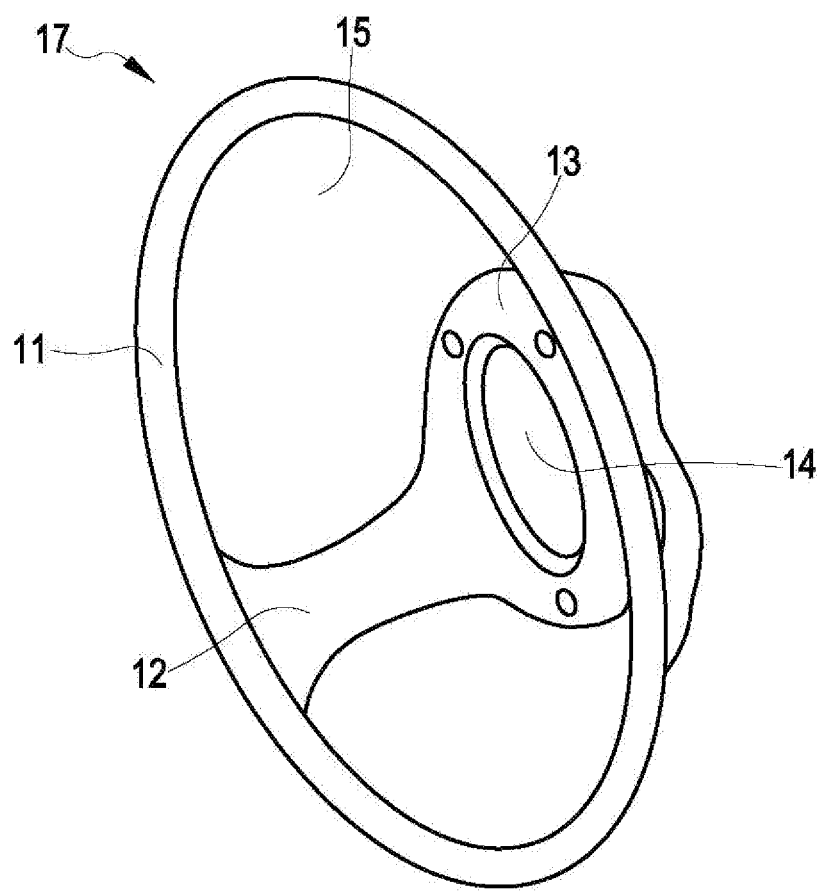
FIG. 2 schematically shows the armature of a steering wheel according to FIG. 1.

FIG. 2 represents a possible embodiment of armature 17 of steering wheel 1, including a rim 11, a plurality of curved spokes 12 and a central plate, or hub portion, 13 which has a substantially circular shape and which is provided with a central hole 14. Hole 14 lies on a plane that is retracted with respect to the plane on which rim 11 lies.

The plurality of curved spokes 12 connect rim 11 with central plate 13. This connection results in that the steering wheel 1 encompasses an accessible volume 15 delimited by central plate 13 and by the plurality of curved spokes 12; as mentioned, volume 15 is suitable for housing carrier 2. The steering wheel 1 conventionally acts on the direction of the vehicle through rotating steering shaft 1a.

In the embodiment shown in FIGS. 1 and 6, the rotational movement of armature 17 of the steering wheel 1 can advantageously be transmitted to the steering shaft 1a by means of a planetary gear mechanism 3, which allows the armature 17 to rotate around its axis, while keeping the carrier 2 fixed in the central volume 15 of the steering wheel.

Figure 3:
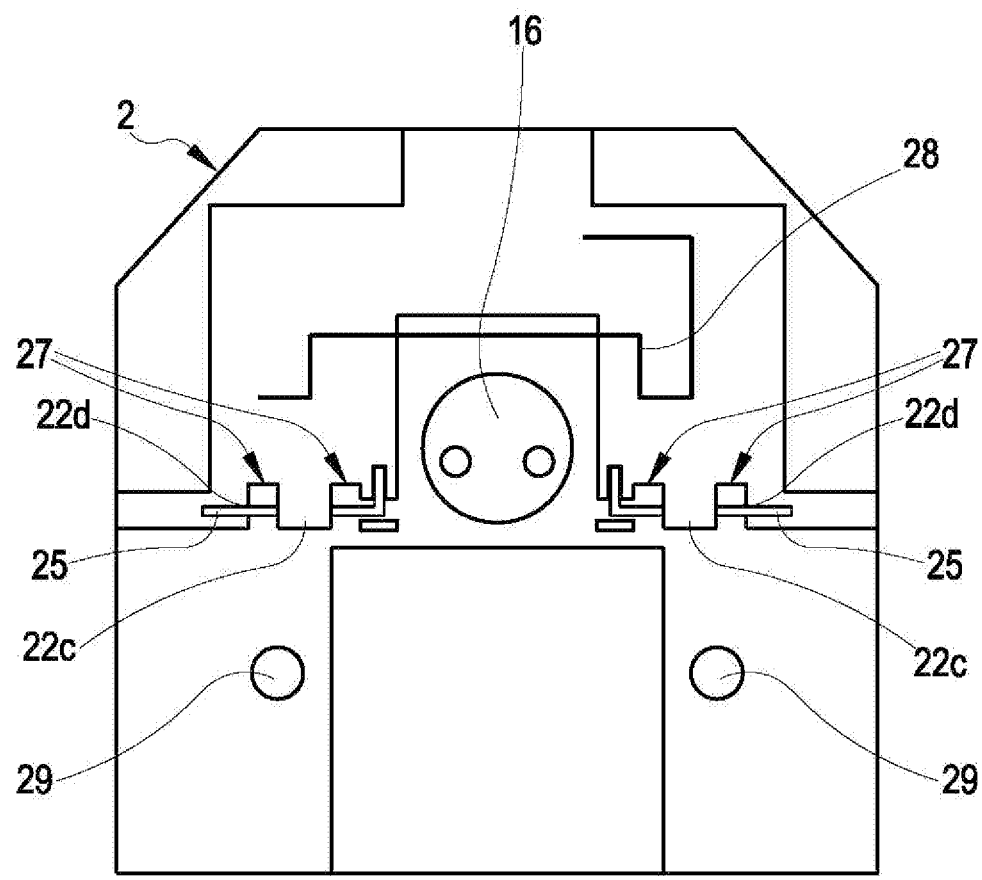
FIG. 3 schematically shows the carrier of the DAB according to FIG. 1.

FIG. 3 shows a possible embodiment of the carrier 2, in particular of a non-rotating carrier 2, which is provided with a hub 16 on its backside, configured for connection with the planetary gear mechanism 3, passing through hole 14 provided in central plate 13 of armature 17.

Carrier 2, which remains fixed with respect to the rotation of armature 17, is suitable for housing instruments and safety devices, in particular for housing a driver airbag (DAB) module 4, a monitor or display 31 (FIG. 6) and at least a portion of a compact horn activation mechanism 29, 30, 24.

The driver airbag module 4 comprises a housing 20 preferably made of a plastic material, from which at least one connecting element, preferably a plurality of connecting elements, extends. Connecting elements comprise at least one hinge 22, preferably a plurality of hinges 22.

According to an aspect, a hinge 22 according to the invention includes at least one hinge flange 22a, that projects from the DAB housing and is provided with a through hole 22b and at least a second hinge flange 22c that projects (directly or indirectly) from carrier 2 and is provided with a through hole 22d. To connect DAB and carrier, said first and second flanges 22a, 22c are positioned adjacent to each other, the holes 22b and 22d are coaxially aligned and the flanges are connected with a hinge wire 25 extending through holes 22b, 22d.

The housing 20 of the driver airbag module 4 is preferably provided with at least a further type of connecting element to connect the housing to the carrier, preferably with a floating connection suitable to allow operating a horn assembly. The configuration of means 24 may be different from the configuration of connecting element 22. In a preferred embodiment, the additional connecting element includes at least one snap pin 24, preferably at least two snap pins 24. Snap pins 24 are suitable for a floating connection of housing 20 of airbag module 4 with at least a portion of steering wheel 1, preferably with a portion of the carrier.

Figure 4:
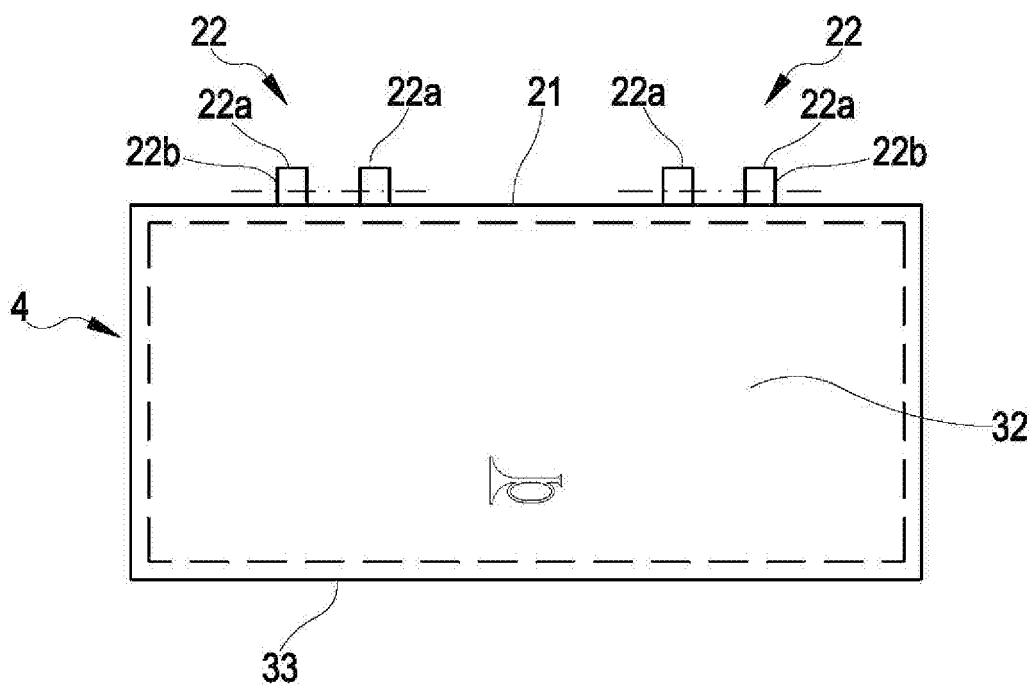
FIG. 4 is a schematic front view of the airbag module according to the invention.
Figure 4A:
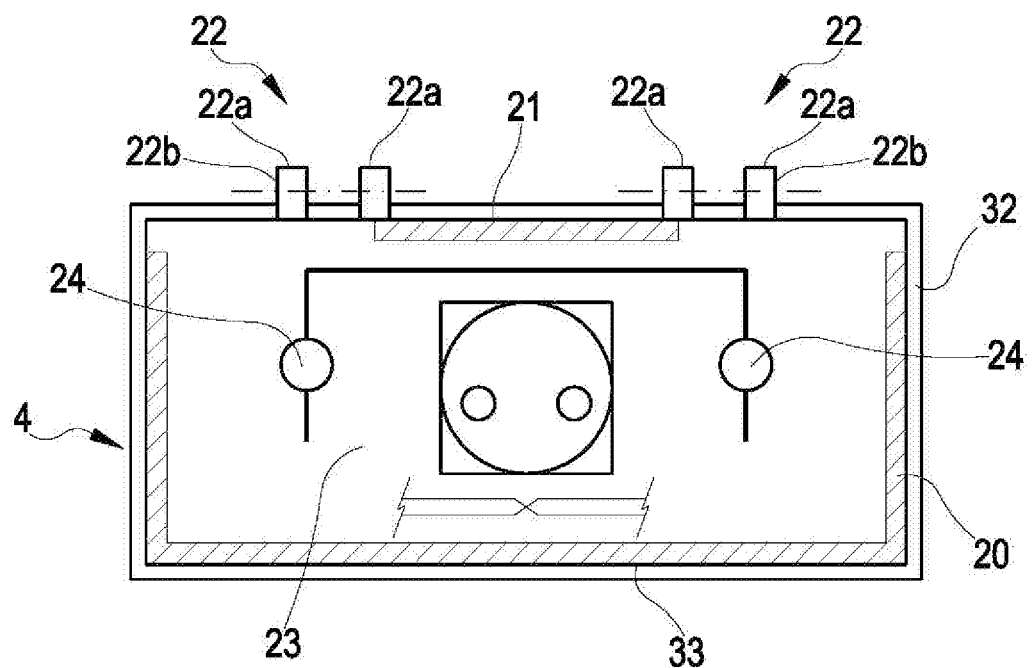

FIGS. 4 and 4a show a possible embodiment of a driver airbag module according to the present invention, comprising a housing 20 with a substantially rectangular shape, wherein one of the longer sides corresponds to the upper surface, 21, of housing 20 is provided with two pairs of above cited hinge flanges 22a having a through hole 22b. As visible in FIG. 5, hinges 22 comprise, as above discussed, hinge flanges on the DAB housing and on the carrier and corresponding recesses on the carrier to house DAB hinge flanges. Hinge wire 25, shown in FIGS. 3 and 5, preferably has an L shape; the short side of the L wire may be blocked on the carrier 2 in a way know per se in the art, e.g. by snap fixing after wire 25 has been inserted into holes 22b and 22d of the aligned hinge portions, or hinge flanges.

It has to be noted that a possible embodiment shown in FIGS. 4 and 4a the driver airbag module has a substantially rectangular shape, but other shapes, e.g. designed for the best use of the available space in the carrier and for the best way of actuating the horn, may be advantageously used.

As previously mentioned, the assembly of the invention may have additional connecting means for securing the DAB to the carrier. The additional connecting means should provide a floating connection so as to provide the possibility of pressing the cover of the DAB and move the DAB towards the carrier to actuate the horn mechanism. In the embodiment of FIG. 4a, the housing 20 of the driver airbag module 4 has a back surface 23 from which two snap pins 24 extend.

Figure 5:
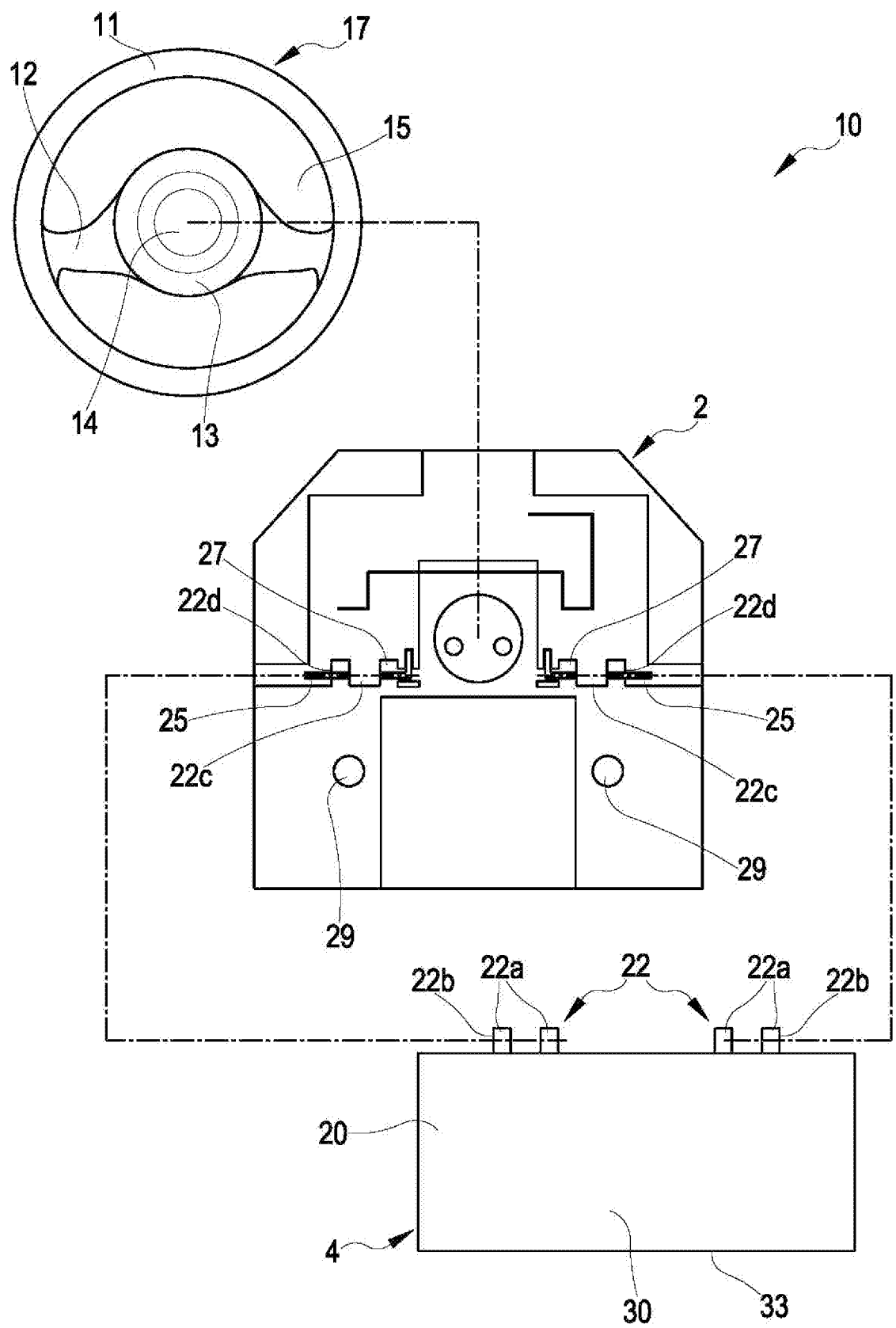
FIG. 5 is a schematic representation of elements comprised in the assembly of the driver airbag module and steering wheel according to the invention.

Each snap pin 24 is suitable for attaching housing 20 of the airbag module 4 to the steering wheel assembly, preferably to the carrier 2, by snapping said snap pins 24 into hook voids 29 provided on a portion of the steering wheel 1, preferably on a portion of the carrier 2 as shown in FIGS. 3 and 5.

According to an aspect, the housing 20 of the airbag module 4 can be made of a plastic material, according to the motor vehicle on which it is mounted.

The non-rotating carrier 2 represented in FIGS. 3 and 5 in a possible embodiment according to the invention, is preferably provided with suitably shaped mounting recesses 27 configured for housing connecting elements 22 provided on a surface of the housing 20 of the driver airbag module 4. In particular, recesses 27 are suitable for housing hinge flanges 22a; recesses 27 define hinge flange 22c of the carrier.

In other words, the driver airbag module 4 is connected with the carrier 2 by positioning at least a portion of the hinge flanges 22a of the housing 20 into the mounting recesses 27 of the carrier 2, at both sides of hinge flange 22c, the hinge wires 25 are inserted in the aligned through holes 22b of the hinge flanges 22a and of hinge flanges 22c, whereby a swivel connection is obtained.

The carrier 2 is also provided with voids 29 suitable for a snapping connection with snap pins 24 provided on the back surface of housing 20 of the DAB 4. According to an aspect, the swivel connection can be operated by means of at least one hinge wire 25 which has a substantially straight shape or by means of a plurality of hinge wires 25 having an L-shape. The hinge wires 25 are preferably made of a metal material.

A compact horn activation mechanism 30 is provided to the assembly 10 of driver airbag module 4 and steering wheel 1 according to the invention.

The horn activation mechanism 30, comprises, in a way known in the art, at least an electric contact connected to a portion of the steering wheel 1. The horn mechanism can be mounted on the steering wheel 1, preferably in the carrier 2 so as to be movable between a raised rest position and a lowered position for horn actuation, by means of at least one spring interposed between the back side of housing 20 of the driver airbag module 4 and steering wheel 1 for biasing the activation element towards its raised position in a floating connection.

According to an aspect, said at least one spring can be partially wound around said at least one snap pin 24, cooperating for said floating connection of the driver airbag module 4 with the steering wheel 1, preferably with the carrier 2. The horn activation mechanism 30 according to the invention can be provided as usual in DAB modules in the lower portion of the steering wheel 1, preferably in the lower portion of carrier 2 with respect to the monitor 31, and can be positioned outside the driver airbag module 4.

According to another aspect, at least a portion of the horn activation mechanism 30 according to the invention can be provided inside the housing 20 of driver airbag module 4. It has to be noted that, according to an aspect of the present invention, the horn activation mechanism 30 is positioned in correspondence of the lower portion of the carrier 2, e.g. at the commonly said 6'o clock position.

The horn activation mechanism 30 is activated by the pressure operated by the driver on a portion of the cover 32 of DAB 4.

When the driver pushes or presses the DAB cover in correspondence of said 6'o clock position, the driver airbag module 4 rotates for horn actuation, by means of the swivel connection given by the hinges 22, and hinge wire 25.

DAB's edge 33 is pressed towards armature 17, thus resulting in the activation of the horn mechanism. When the pressure ends, the airbag module is allowed to return to its raised rest position, by means of the floating connection given by the cooperation of the snap pins 24 and the spring 30.

According to an aspect, the compact horn activation mechanism comprises a plastic housing, which can be the same housing of the airbag module or can be a different housing.

The invention claimed is:

1. An assembly of a driver airbag, the assembly comprising:
   a steering wheel having an armature encompassing a volume;
   a carrier formed separately from the steering wheel, the carrier being disposed within the volume and coupled to the steering wheel;
   a driver airbag module including a housing, the driver airbag module being disposed within the carrier; and
   at least one connecting element for connection of the driver airbag module with the carrier, wherein the at least one connecting element comprises swiveling means, whereby upon connection at the swiveling means, the driver air bag module may rotate with respect to the steering wheel,
   wherein the swiveling means includes at least one hinge, the at least one hinge includes a first hinge flange, a second hinge flange, and a hinge wire, the first hinge flange extending from the housing of the driver airbag module and defining a first through hole, the second hinge flange extending from the carrier and defining a second through hole,
   wherein the first through hole and the second through hole are adjacent each other, and wherein the hinge wire extends through the first and second through holes such that the driver airbag module is pivotable with respect to the carrier, wherein the driver airbag module is biased toward a resting position by a spring force.

2. The assembly according to claim 1, wherein the housing of the driver airbag module includes at least one further connecting element for connection of the housing with said steering wheel.

3. The assembly according to claim 2, wherein the at least one further connecting element comprises at least one snap pin and the carrier defines at least one void suitable for connection with the at least one snap pin.

4. The assembly according to claim 3, wherein the at least one hinge and the at least one snap pin are located at different, first and second sides of the driver airbag module, whereby the at least one hinge provides a swiveling connection with the steering wheel adjacent the first side of the housing of the driver airbag module and the at least one snap pin provides a floating connection with the steering wheel adjacent the second side of the housing of the driver airbag module to form a floating portion.

5. The assembly according to claim 4, further comprising at least a portion of a horn activation mechanism, the horn activation mechanism being actuated by pressure on the floating portion of the driver airbag module.

6. The assembly according to claim 5, wherein the horn activation mechanism is housed in the carrier.

7. The assembly according to claim 5, wherein at least a portion of the horn activation mechanism is housed in the housing of the driver airbag module.

8. The assembly according to claim 7, wherein the horn activation mechanism is embedded in the driver airbag module.

9. The assembly according to claim 1, further comprising a display disposed within the carrier.

10. The assembly according to claim 9, wherein the display is disposed above the driver airbag module within the carrier when the steering wheel is in an upright position.

11. The assembly according to claim 9, wherein the display is non-rotatable with respect to the carrier.

12. A driver airbag module assembly comprising:
a carrier for connecting the driver airbag module assembly to a steering wheel, the carrier being formed separately from the steering wheel; and
a driver air bag module disposed within the carrier and having at least one connecting element coupling the driver airbag module to the carrier,
wherein the at least one connecting element provides a swiveling connection between the driver airbag module and the carrier,
wherein the swiveling means includes at least one hinge, the at least one hinge includes a first hinge flange, a second hinge flange, and a hinge wire, the first hinge flange extending from a housing of the driver airbag module and defining a first through hole, the second hinge flange extending from the carrier and defining a second through hole,
wherein the first through hole and the second through hole are adjacent each other, and
wherein the hinge wire extends through the first and second through holes such that the driver airbag module is pivotable with respect to the carrier, wherein the driver airbag module is biased toward a resting position by a spring force.

13. The driver airbag module assembly according to claim 12, wherein the housing of the driver airbag module is provided with at least one further connecting element.

14. The driver air bag module assembly according to claim 13, wherein the at least one further connecting element comprises at least one snap pin and the carrier defines at least one void suitable for connection with the at least one snap pin.

15. The driver air bag module assembly according to claim 12, further comprising a display disposed within the carrier.

16. The driver air bag module assembly according to claim 15, wherein the display is configured to be disposed above the driver airbag module within the carrier when the carrier is coupled to a steering wheel that is in an upright position.

17. The driver air bag module assembly according to claim 15, wherein the display is non-rotatable with respect to the carrier.

* * * * *